(12) United States Patent
Ding et al.

(10) Patent No.: US 9,259,816 B2
(45) Date of Patent: Feb. 16, 2016

(54) LOCKING MECHANISM

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Zhen-Yong Ding, Shenzhen (CN); Xian-Hong Zou, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 377 days.

(21) Appl. No.: 13/968,006

(22) Filed: Aug. 15, 2013

(65) Prior Publication Data

US 2014/0070476 A1 Mar. 13, 2014

(30) Foreign Application Priority Data

Sep. 7, 2012 (CN) .......................... 2012 1 0329134

(51) Int. Cl.
| | |
|---|---|
| *B23Q 3/00* | (2006.01) |
| *B23Q 3/06* | (2006.01) |
| *B25B 5/06* | (2006.01) |
| *B25B 5/08* | (2006.01) |

(52) U.S. Cl.
CPC . *B23Q 3/06* (2013.01); *B25B 5/062* (2013.01); *B25B 5/08* (2013.01)

(58) Field of Classification Search
USPC ........................................................ 269/287
See application file for complete search history.

(56) References Cited

U.S. PATENT DOCUMENTS

| | | | | | |
|---|---|---|---|---|---|
| 2,888,052 | A | * | 5/1959 | Reason ..................... | B23Q 3/06 269/246 |
| 3,572,216 | A | * | 3/1971 | Seesody .................... | B23Q 3/08 269/32 |
| 4,174,828 | A | * | 11/1979 | Bergman ................... | B23Q 1/38 269/157 |
| 4,265,434 | A | * | 5/1981 | Hamilton ................... | B25B 5/062 269/27 |
| 4,275,983 | A | * | 6/1981 | Bergman ................. | B23Q 16/001 198/345.3 |
| 4,583,631 | A | * | 4/1986 | Yonezawa ............... | B23Q 1/0018 198/345.3 |
| 4,620,695 | A | * | 11/1986 | Vanistendael ............. | B25B 5/16 269/24 |
| 4,909,493 | A | * | 3/1990 | Yonezawa ................ | B25B 5/087 269/309 |
| 5,013,015 | A | * | 5/1991 | Fatheree .................. | B25B 5/062 269/24 |

(Continued)

FOREIGN PATENT DOCUMENTS

| | | | | |
|---|---|---|---|---|
| CN | 201544045 U | | 8/2010 | |
| DE | 10235577 A1 | * | 2/2004 | ............... B25B 5/08 |

(Continued)

*Primary Examiner* — Lee D Wilson
*Assistant Examiner* — Alvin Grant
(74) *Attorney, Agent, or Firm* — Novak Druce Connolly Bove + Quigg LLP

(57) ABSTRACT

A locking mechanism, for fixing and positioning a workpiece, includes a base, a locking member, a retaining plate, and an elastic member. The base defines a through mounting hole. The locking member comprises a main body, a blocking portion, and a latching portion. The blocking portion and the latching portion are respectively formed on opposite ends of the main body. The retaining plate is mounted on the base by the at least one locking member, and defines a through first opening corresponding to the mounting hole. The main body passes through the mounting hole and the first opening, the elastic member resists against the base and the blocking portion, such that the latching portion is engaged with and latched with the retaining plate by an elastic force of the elastic member.

20 Claims, 3 Drawing Sheets

(56) References Cited

U.S. PATENT DOCUMENTS

| | | | | |
|---|---|---|---|---|
| 5,192,058 A | * | 3/1993 | VanDalsem | B25B 5/062 269/24 |
| 5,899,445 A | * | 5/1999 | Kimble | B25B 5/06 269/21 |
| 6,299,151 B1 | * | 10/2001 | Smith | B23Q 1/0018 269/24 |
| 8,523,155 B2 | * | 9/2013 | Kuroda | F16L 39/04 137/614 |

FOREIGN PATENT DOCUMENTS

| | | | | |
|---|---|---|---|---|
| DE | 2025471 A2 | * | 2/2009 | B23Q 1/009 |
| JP | WO 2012073723 A1 | * | 6/2012 | B23Q 1/009 |
| JP | WO 2012111666 A1 | * | 8/2012 | B23Q 1/009 |

* cited by examiner

LOCKING MECHANISM

BACKGROUND

1. Technical Field

The present disclosure relates to locking mechanisms, and particularly to a locking mechanism having a high working efficiency.

2. Description of the Related Art

A workpiece is positioned and fixed by a locking mechanism when in a machining process. A typical locking mechanism includes a base, a plurality of screws, and a plurality of locking plates. The workpiece is placed on the base. The locking plates are securely mounted on the base by the screws, and resist against the workpiece. When unloading the workpiece, a time-consuming unlocking process is needed, and the screws are easily damaged.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
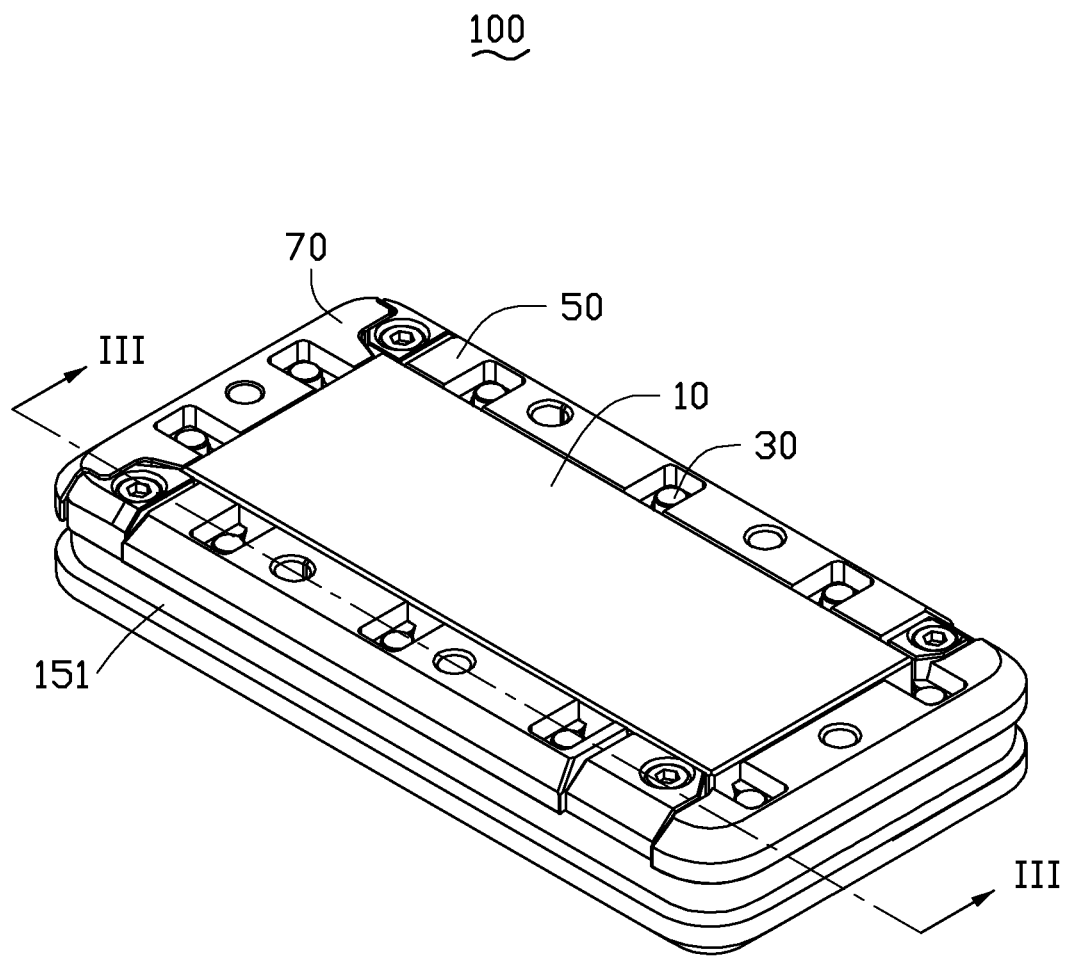
FIG. 1 is an assembled, isometric view of one embodiment of a locking mechanism.
Figure 2:
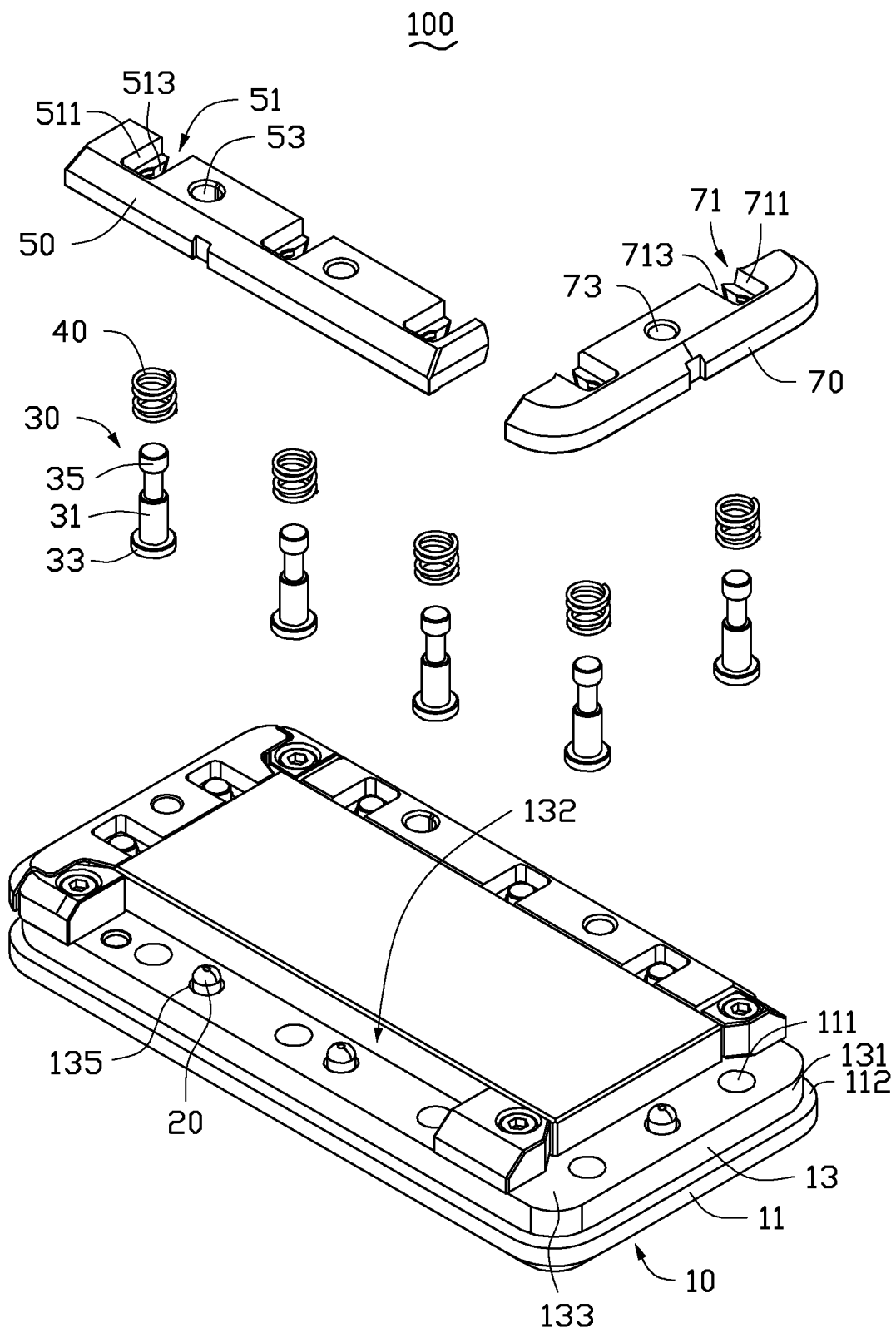
FIG. 2 is a partially assembled, and isometric view of the locking mechanism of FIG. 1.

FIGS. 1 and 2 shows an embodiment of a locking mechanism 100, for positioning and fixing a workpiece (not shown) to be machined. In an illustrated embodiment, the workpiece is rectangular and frame-like. The locking mechanism 100 includes a base 10, a plurality of locking members 30, a plurality of elastic members 40, two first retaining plates 50, and two second retaining plates 70.

Figure 3:
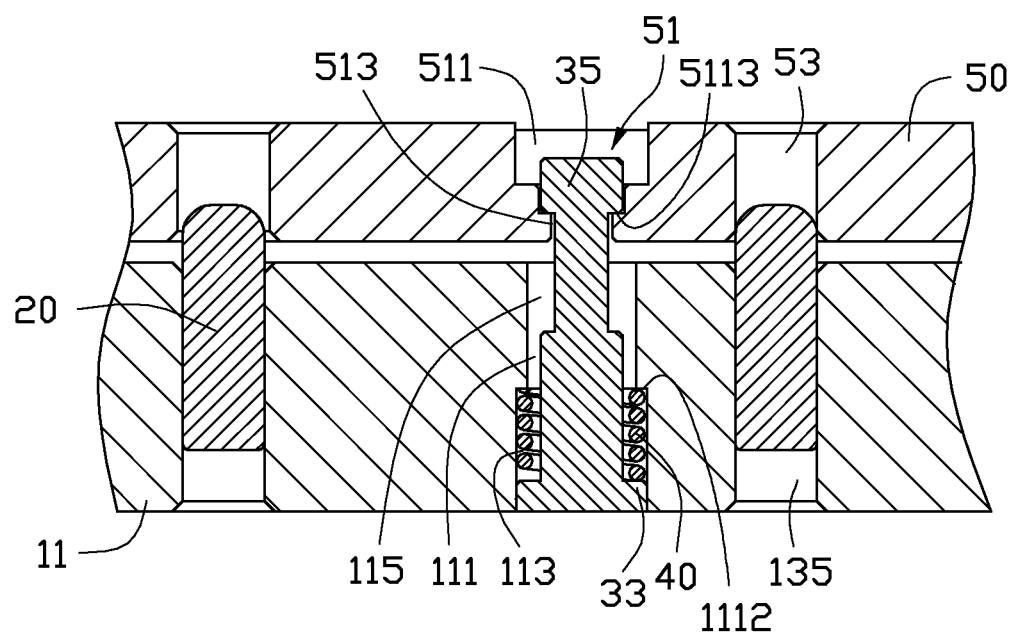
FIG. 3 is a cross-section view of the locking mechanism of FIG. 1, along line III-III.

Referring to FIG. 3 also, the base 10 is substantially rectangular, and includes a support portion 11 and a positioning portion 13 protruding from the support portion 11. The support portion 11 includes a support surface 112 adjacent to the positioning portion 13. The positioning portion 13 is a substantially rectangular block formed on the support portion 11. The positioning portion 13 includes a resisting surface 131 substantially perpendicularly to the support surface 112 in a periphery thereof. A plurality of mounting holes 111 is defined in a periphery of the resisting surface 131 through the support portion 11, and spaced from each other. A plurality of fixing holes 135 is further defined in the periphery of the resisting surface 131 through the support portion 11, spaced from each other, and adjacent to the corresponding mounting holes 111. In the illustrated embodiment, four accommodation portions 132 are formed on a top of the positioning portion 13 by depressions around the periphery. A fixing surface 133 is formed on a bottom of each accommodation portion 132 perpendicularly to the resisting surface 131. In other embodiments, a shape of the base 10 can be changed according to a shape of the workpiece, such as disk-like for example. The four accommodation portions 132 communicate with each other, thereby forming an integrated accommodation portion. In the illustrated embodiment, each mounting hole 111 is a stepped hole having an engaging surface 1112, and includes a first receiving hole 113 and a second receiving hole 115. A diameter of the first receiving hole 113 is greater than that of the second receiving hole 115.

In the illustrated embodiment, the locking mechanism 100 further includes a plurality of positioning members 20. One end of each positioning member 20 is securely received in the corresponding fixing hole 135, and the other end of the positioning member 20 protrudes out from the corresponding fixing hole 135, for preventing the first retaining plate 50 and the second retaining plate 70 from detaching from the base 10. The end of the positioning member 20 is threadedly engaged in the corresponding fixing hole 135. In other embodiments, the end of the positioning member 20 can be fixed in the corresponding fixing hole 135 by interference fit. The fixing holes 135 can also be omitted, and the positioning members 20 are directly formed on the support surface 112.

Each locking member 30 is movably mounted in the corresponding mounting hole 111, for fixing the first retaining plates 50 and the second retaining plates 70 to the base 10. In the illustrated embodiment, the locking member 30 is a pin. Each locking member 30 includes a main body 31, a blocking portion 33, and a latching portion 35. The blocking portion 33 and the latching portion 35 are respectively formed on opposite ends of main body 31. The main body 31 is cylindrical, and received in the mounting hole 111. The blocking portion 33 is received in the first receiving hole 113. The blocking portion 33 has a diameter greater than that of the main body 31. The latching portion 35 protrudes out from the second receiving hole 115 and is latched with the first retaining plates 50 or the second retaining plates 70.

The elastic members 40 are respectively received in the first receiving holes 113. Opposite ends of each elastic member 40 elastically respectively resist against the blocking portion 33 and the engaging surface 1112 in the mounting hole 111.

The first retaining plates 50 are respectively mounted on the fixing surfaces 133 in two opposite accommodation portions 132, and partly protrude out from the fixing surfaces 133, such that the support surface 112, the resisting surface 131 and the two retaining plates 50 cooperatively form a fixing groove 151. The workpiece is securely received in the fixing groove 151, resists against the support surface 112, the resisting surface 131 and the two retaining plates 50. The first retaining plate 50 is rectangular and strip-like, and defines a plurality of first openings 51 corresponding to the mounting holes 111. The first openings 51 communicate to an inner side surface of the first retaining plate 50. In the illustrated embodiment, the first opening 51 includes a first retaining hole 511 and a first passing-through hole 513 with a smaller diameter than the first retaining hole 511. The first retaining hole 511 is stepped and having a latching surface 5113. The main body 31 of the locking member 30 slides in the first passing-through hole 513, and the latching portion 35 resists against the latching surface 5113 of the first retaining hole 511, such that the first retaining plate 50 is fixed on the base 10 along an axial direction of the locking member 30. The first retaining plate 50 further defines a plurality of first limiting holes 53 corresponding to the positioning members 20. One end of the positioning members 20 is received in the corresponding first limiting holes 53, for positioning the first retaining plates 50 along a direction perpendicularly to the axial direction of the first limiting hole 53. In other embodiments, the first openings 51 can communicate to an outer side surface of the first retaining plate 50.

The second retaining plate 70 has a similar structure to the first retaining plate 50. However, the second retaining plate 70 has a smaller length than the first retaining plate 50. The two second retaining plates 70 are mounted on the fixing surface 133 in the other two accommodation portions 132, and protrude out from the fixing surface 133, for fixing the workpiece. The second retaining plate 70 is rectangular and strip-like, and defines a plurality of second openings 71. The second openings 71 communicate to an inner side surface of the second retaining plate 70. In the illustrated embodiment, the second opening 71 includes a second retaining hole 711 and a second passing-through hole 713 with a smaller diameter than the second retaining hole 711. The second retaining hole 711 is stepped. The main body 31 of the locking member 30 slides in the second passing-through hole 713, and the latching portion 35 resists against a latching surface (not shown) of the second retaining hole 711. The second retaining plate 70 further defines a plurality of second limiting holes 73 corresponding to the positioning members 20. One end of the positioning members 20 are received in the corresponding second limiting holes 73, for positioning the second retaining plates 70 along a direction perpendicularly to the axial direction of the second limiting hole 73.

In use, the workpiece is mounted on the support surface 112 of the support portion 11, and resists against the resisting surface 131. The base 10 is placed on a worktable (not shown) having a plurality of protrusions corresponding to the blocking portions 33 of the locking members 30, and the elastic members 40 are pressed. The base 10 is pressed by a pressing mechanism (not shown) above the protrusions, such that the protrusions pushes the blocking portions 33, and the latching portions 35 protrude out from the second receiving hole 115. The two first retaining plates 50 are respectively mounted in two accommodation portions 132, and move relative to the main bodies 31 via the first opening 51, so that the latching portions 35 are received in the first retaining holes 511. The two second retaining plates 70 are respectively mounted in the other two accommodation portions 132, and move relative to the main bodies 31 via the second opening 71, so that the latching portions 35 are received in the second retaining holes 711. The base 10 is released by the pressing mechanism, the locking members 30 return to the original state by the elastic member 40, such that the latching portions 35 resist against the latching surfaces 5113 of the first retaining holes 511 and the latching surfaces of the second retaining holes 711, and the first retaining plates 50 and the second retaining plates 70 resist against the workpiece to fix and position the workpiece.

When detaching the workpiece, the base 10 is placed on the worktable, and the protrusions respectively support the blocking portions 33. The base 10 is pressed by the pressing mechanism, such that the protrusions respectively push the blocking portions 33, the elastic members 40 are pressed, and the latching portions 35 detach from the bottom surfaces of the first retaining holes 511 and the second retaining holes 711. The first retaining plates 50 and the retaining plates 70 are detached from the base 10 respectively via the first openings 51 and the second openings 71, such that the workpiece is detached from the base 10. The locking mechanism 100 has a simple locking and detaching process with a high efficiency.

In other embodiments, the first retaining plates 50 has a same length as the second retaining plates 70 according to a shape of the base 10. Numbers of the first retaining plates 50 and the second retaining plates 70 are not limited to the illustrated embodiment, and can be changed as the shape of the workpiece. The second retaining plates 70 can be omitted, and only the first retaining plates 50 are used to position the workpiece. A number of the mounting holes 111 can be changed, for example one, and accordingly, numbers of the first limiting holes 53 and the second limiting holes 73 can be changed.

It is to be understood, however, that even though numerous characteristics and advantages of the disclosure have been set forth in the foregoing description, together with details of the structure and function of the embodiments, the disclosure is illustrative only, and changes may be made in detail, especially in the matters of shape, size, and arrangement of parts within the principles of the embodiments to the full extent indicated by the broad general meaning of the terms in which the appended claims are expressed.

What is claimed is:

1. A locking mechanism, for fixing and positioning a workpiece, comprising:
    a base for supporting the workpiece, the base defining a through mounting hole;
    at least one locking member comprising a main body, a blocking portion and a latching portion, the blocking portion and the latching portion respectively formed on opposite ends of the main body;
    at least one first retaining plate mounted on the base by the at least one locking member, the at least one first retaining plate defining a through first opening corresponding to the mounting hole; and
    an elastic member, wherein the main body passes through the mounting hole and the first opening, the elastic member resists against the base and the blocking portion, the latching portion is engaged with and latched with the at least one first retaining plate by an elastic force of the elastic member.

2. The locking mechanism of claim 1, further comprising a limiting member, wherein the limiting member is mounted on the base, the at least one first retaining plate further defines a first limiting hole corresponding to the limiting member, and one end of the limiting member is received in the first limiting hole, for positioning the at least one first retaining plates along a direction perpendicularly to the axial direction of the first limiting hole.

3. The locking mechanism of claim 2, wherein the base further defines a fixing hole, and the limiting member is securely mounted in the fixing hole.

4. The locking mechanism of claim 1, wherein the base comprises a support portion and a positioning portion protruding from the support portion, the mounting hole is defined in the positioning portion through the support portion, and the at least one first retaining plate is mounted on the positioning portion.

5. The locking mechanism of claim 4, wherein the mounting hole is stepped and having a stepped surface, the mounting hole comprises a first receiving hole and a second receiving hole communicating to the first receiving hole, the main body is received in the first receiving hole and the second receiving hole, the blocking portion is received in the first receiving hole, the elastic member is received in the first receiving hole, and the opposite ends of the elastic member respectively resist against the stepped surface and the blocking portion.

6. The locking mechanism of claim 4, wherein at least one accommodation portion is formed on a top of the positioning portion by depression, the at least one first retaining plate is mounted in the accommodation portion, and partly protrude out from the positioning portion.

7. The locking mechanism of claim 6, wherein the support portion comprises a support surface adjacent to the positioning portion, the positioning portion comprises a resisting surface substantially perpendicularly to the support surface, the support surface, the resisting surface and the two retaining plates cooperatively form a fixing groove, for positioning the workpiece.

8. The locking mechanism of claim 1, wherein the first opening is stepped, and communicates to an inner side surface of the at least one first retaining plate.

9. The locking mechanism of claim 8, wherein the first opening comprises a first retaining hole and a first passing-through hole with a smaller diameter than the first retaining hole, and the latching portion of the at least one locking member is latched with the first retaining hole.

10. The locking mechanism of claim 1, further comprising at least one second retaining plate mounted on the base by the at least one locking member, the at least one second retaining plate defining a through second opening corresponding to the mounting hole, wherein the at least one second retaining plate is positioned adjacent to the at least one first retaining plate.

11. A locking mechanism, for fixing and positioning a workpiece, comprising:
- a base for supporting the workpiece, the base defining a through mounting hole;
- at least one locking member comprising a main body, a blocking portion and a latching portion, the blocking portion and the latching portion respectively formed on opposite ends of the main body;
- at least one first retaining plate mounted on the base by the at least one locking member, the at least one first retaining plate defining a through first opening corresponding to the mounting hole, and the first opening communicating to an inner side surface of the at least one first retaining plate; and
- an elastic member received in the mounting hole, wherein the main body passes through the mounting hole and the first opening, the elastic member resists against the base and the blocking portion, the latching portion is engaged with and latched with the at least one first retaining plate by an elastic force of the elastic member.

12. The locking mechanism of claim 11, further comprising a limiting member, wherein the limiting member is mounted on the base, the at least one first retaining plate further defines a first limiting hole corresponding to the limiting member, and one end of the limiting member is received in the first limiting hole, for positioning the at least one first retaining plates along a direction perpendicularly to the axial direction of the first limiting hole.

13. The locking mechanism of claim 12, wherein the base further defines a fixing hole, and the limiting member is securely mounted in the fixing hole.

14. The locking mechanism of claim 11, wherein the base comprises a support portion and a positioning portion protruding from the support portion, the mounting hole is defined in the positioning portion through the support portion, and the at least one first retaining plate is mounted on the positioning portion.

15. The locking mechanism of claim 14, wherein the mounting hole is stepped and having a stepped surface, the mounting hole comprises a first receiving hole and a second receiving hole communicating to the first receiving hole, the main body is received in the first receiving hole and the second receiving hole, the blocking portion is received in the first receiving hole, the elastic member is received in the first receiving hole, and the opposite ends of the elastic member respectively resist against the stepped surface and the blocking portion.

16. The locking mechanism of claim 14, wherein at least one accommodation portion is formed on a top of the positioning portion by depression, the at least one first retaining plate is mounted in the accommodation portion, and partly protrude out from the positioning portion.

17. The locking mechanism of claim 16, wherein the support portion comprises a support surface adjacent to the positioning portion, the positioning portion comprises a resisting surface substantially perpendicularly to the support surface, the support surface, the resisting surface and the two retaining plates cooperatively form a fixing groove, for positioning the workpiece.

18. The locking mechanism of claim 11, wherein the first opening is stepped.

19. The locking mechanism of claim 18, wherein the first opening comprises a first retaining hole and a first passing-through hole with a smaller diameter than the first retaining hole, and the latching portion of the at least one locking member is latched with the first retaining hole.

20. The locking mechanism of claim 11, further comprising at least one second retaining plate mounted on the base by the at least one locking member, the at least one second retaining plate defining a through second opening corresponding to the mounting hole, wherein the at least one second retaining plate is positioned adjacent to the at least one first retaining plate.

* * * * *